(12) United States Patent
Hong et al.

(10) Patent No.: US 6,588,247 B2
(45) Date of Patent: Jul. 8, 2003

(54) HUB LOCK RELEASING STRUCTURE FOR A TAPE RECORDER AND RELATED METHOD OF FABRICATION

(75) Inventors: Sung-hee Hong, Suwon (KR); Jae-kab Seo, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 61 days.

(21) Appl. No.: 09/791,569

(22) Filed: Feb. 26, 2001

(65) Prior Publication Data

US 2002/0020774 A1 Feb. 21, 2002

(30) Foreign Application Priority Data

Aug. 19, 2000 (KR) ........................................ 2000-48099

(51) Int. Cl.[7] .............................................. B21D 28/02
(52) U.S. Cl. .................................. 72/379.2; 242/338.3
(58) Field of Search ........................... 242/338, 338.1, 242/338.2, 338.3, 358; 72/326, 335, 379.2

(56) References Cited

U.S. PATENT DOCUMENTS 3,059,871 A * 10/1962 Loewe ..................... 242/338.3
5,463,891 A * 11/1995 Hasegawa ................... 72/379.2

FOREIGN PATENT DOCUMENTS

| GB | 1159084 | * | 7/1969 | ................ 72/379.2 |
| JP | 57-159222 | * | 10/1982 | ................ 72/379.2 |

* cited by examiner

Primary Examiner—Lowell A. Larson
(74) Attorney, Agent, or Firm—Robert E. Bushnell, Esq.

(57) ABSTRACT

A hub lock releasing structure for a tape recorder has a releasing pin for releasing a hub from a locked state by pressing a hub locking member installed on a tape cassette in one direction as the tape cassette settles on a deck. The releasing pin is integrally formed with the deck. In the hub lock releasing structure, since the releasing pin is integrally formed with the deck, the number of necessary components can be reduced and the assembly process can be simplified. A method of fabricating a releasing pin for the hub lock releasing structure comprises providing a deck in the tape recorder for receiving a tape cassette, partially cutting a portion of the deck, and bending the cut portion of the deck upward to form the releasing pin.

17 Claims, 5 Drawing Sheets

HUB LOCK RELEASING STRUCTURE FOR A TAPE RECORDER AND RELATED METHOD OF FABRICATION

CLAIM OF PRIORITY

This application makes reference to, incorporates the same herein, and claims all benefits accruing under 35 U.S.C. §119 from my application A HUB LOCKING RELEASE STRUCTURE FOR TAPE RECORDER filed with the Korean Industrial Property Office on Aug. 19, 2000 and there duly assigned Serial No. 48099/2000.

BACKGROUND OF THE INVENTION

1. Technical Field

The present invention relates to a hub lock releasing structure for a tape recorder and a related method of fabrication. More particularly, the invention relates to a hub lock releasing structure for a tape recorder for unlocking a hub of a tape cassette in a rotatable state, and to a method of fabricating a releasing pin for such a structure.

2. Related Art

A tape cassette used for a tape recorder such as a camcorder which records/reproduces information on/from a magnetic tape generally includes a hub locking member for lock hubs on which a magnetic tape is wound so to prevent rotation thereof, and thus to prevent the magnetic tape from loosening. However, in order to load and operate the tape cassette in a tape recorder, the tape recorder should include a lock releasing structure for releasing the hub from a locked state.

Various lock releasing structures have been developed to accomplish the above-stated objective. However, such lock releasing structures are burdened by disadvantages. Among such disadvantages is one by which individual components of the lock releasing structure are separated prepared, and are then thermally fused for installation. This increases the number of components which must be assembled, and thus the number of steps in assembling the lock releasing structure, and the tape recorder as a whole, increases.

SUMMARY OF THE INVENTION

To solve the above problems, it is an object of the present invention to provide an improved hub lock releasing structure for a tape recorder which can reduce the number of components and simplify the assembly process of the tape recorder, and a related method of fabricating a releasing pin for such a structure.

Accordingly, to achieve the above object, there is provided a hub lock releasing structure for a tape recorder having a releasing pin for releasing a hub from a locked state by pressing a hub locking member installed on a tape cassette in one direction as the tape cassette settles on a deck, wherein the releasing pin is integrally formed with the deck. A method of fabricating a releasing pin for such a structure is also provided.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, and wherein.

DESCRIPTION OF THE PREFERRED EMBODIMENTS

Figure 1:
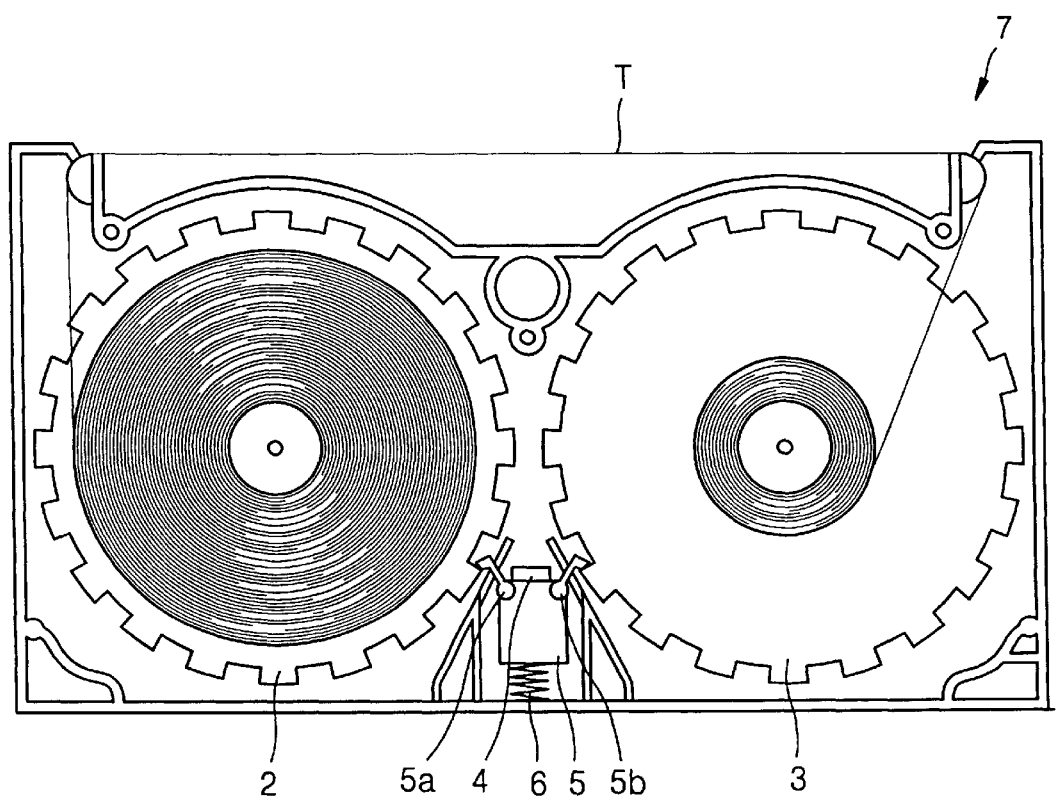
FIG. 1 is a plan view showing the internal structure of a tape cassette.

FIG. 1 is a plan view showing the internal structure of a tape cassette. As seen therein, the tape cassette 7 includes a hub locking member 5 for use with lock hubs 2 and 3 on which a magnetic tape T is wound so to prevent rotation thereof, and therefore to prevent the magnetic tape T from loosening. That is, a locking groove 4 is formed on the bottom of the tape cassette, and the hub locking member 5 is installed in the locking groove 4 so as to be movable in a horizontal direction. A lower end of the hub locking member 5 is elastically supported by a spring 6 which is fixed to tape cassette 7, and an upper end of member 5 is connected to locking arms 5a and 5b which are elastically connected to teeth of the hubs 2 and 3, respectively. More specifically, the locking arms 5a and 5b are connected to the teeth of the hubs 2 and 3, respectively, by an elastic force of the spring 6 so as to interfere with rotation of the hubs 2 and 3. Accordingly, the hubs 2 and 3 are not driven, and thus the magnetic tape T is not loosened.

Figure 2:
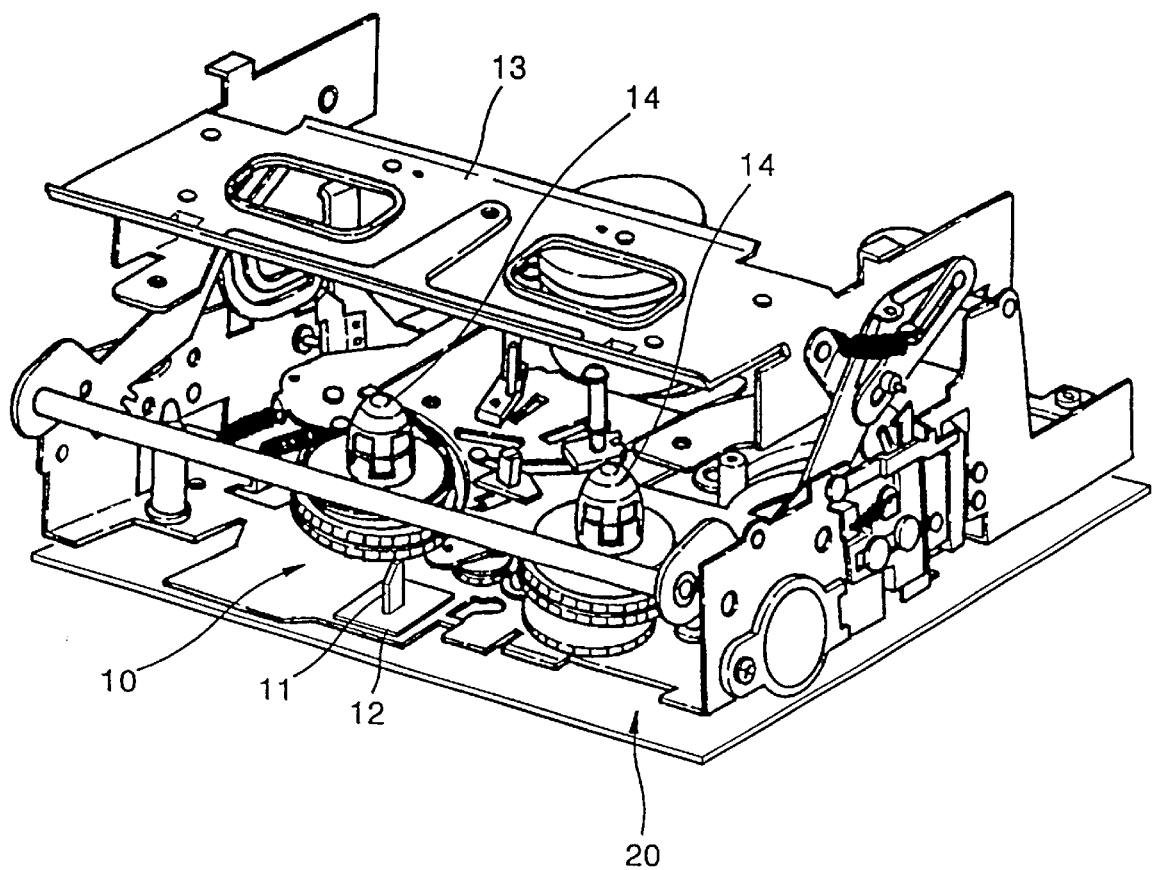
FIG. 2 is a perspective view of a tape recorder employing a hub lock releasing structure.

FIG. 2 shows an embodiment of a hub lock releasing structure for a tape recorder. As seen in FIG. 2, the lock releasing structure includes a support plate 12 fixedly installed on a deck 10, and a releasing pin 11 protruding upwardly from the support plate 12. The deck 10 is installed so as to move on a main chassis 20 according to loading or unloading, and is called a sub-chassis or movable chassis. The support plate 12 and the releasing pin 11 are thermally fused to the deck 10. The releasing pin 11 is inserted in the locking groove 4 (FIG. 1) when tape cassette 7 is received in a cassette holder 13 (FIG. 2) so as to be placed on a reel table 14 on the deck 10. The releasing pin 11 then presses the locking member 5 (FIG. 1) in one direction. Accordingly, the locking arms 5a and 5b of cassette 7 are detached from the teeth of the hubs 2 and 3, respectively, so as to release the hubs 2 and 3 from their locked state.

However, in fabricating the above-described hub lock releasing structure, the support plate 12 (FIG. 2) and the releasing pin 11 are separated prepared, and are then thermally fused to the deck 10 for installation. As a result, the number of components to be separately fabricated increases, and the number of assembly steps required also increases.

Figure 3:
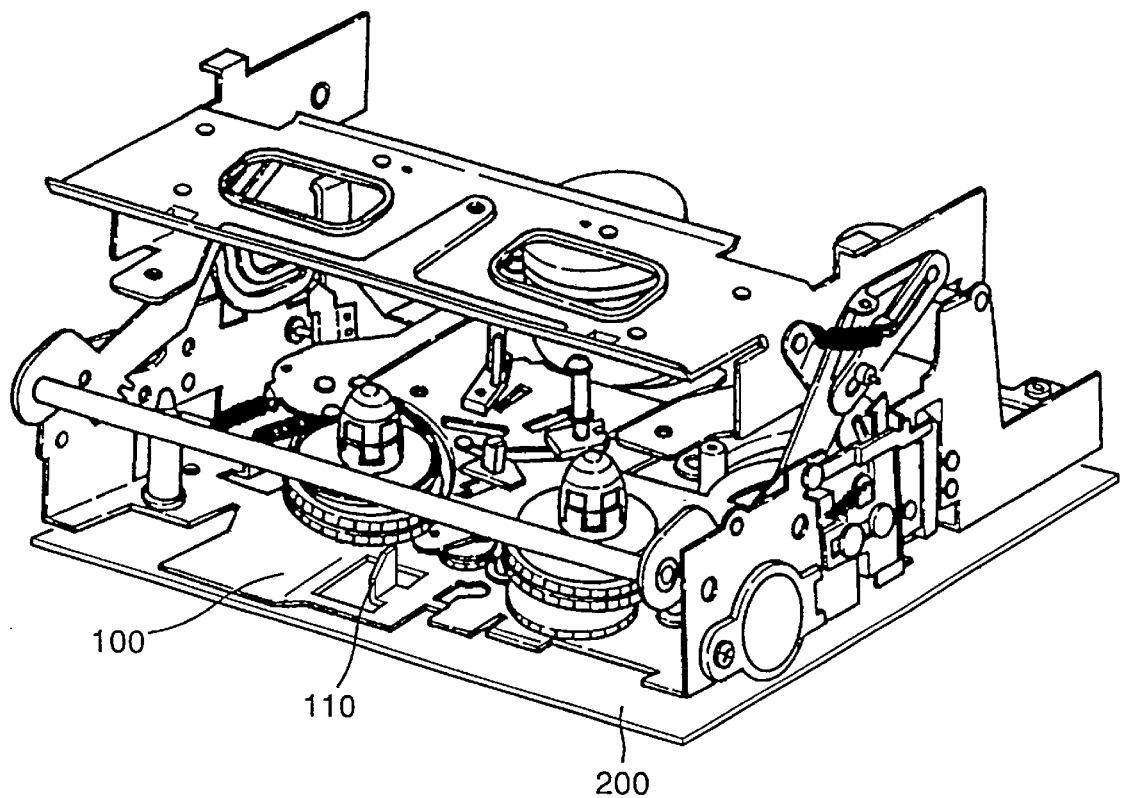
FIG. 3 is a perspective view of a tape recorder employing a hub lock releasing structure according to one embodiment of the present invention.

FIG. 3 shows a hub lock releasing structure according to one embodiment of the present invention.

As shown in FIG. 3, the hub lock releasing structure includes a releasing pin 110 integrally formed with a deck 100 on a main chassis 200. More specifically, the releasing pin 110 is formed by partially cutting the bottom of the deck 100 and bending the same so that it is folded upward. Thus, pin 110 is integrally formed with the deck 100. Moreover, since the releasing pin 110 is integrally formed with the deck 100, rather than being separately provided and then fixed to the deck 100, manufacturing and quality control, as well as the assembly thereof, are facilitated.

Figure 4:
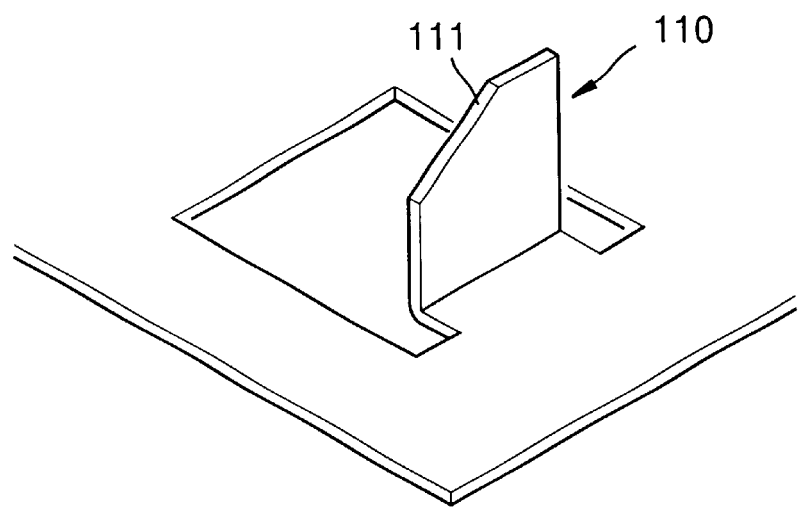
FIG. 4 is an enlarged view illustrating the hub lock releasing structure shown in FIG. 3.
Figure 5:
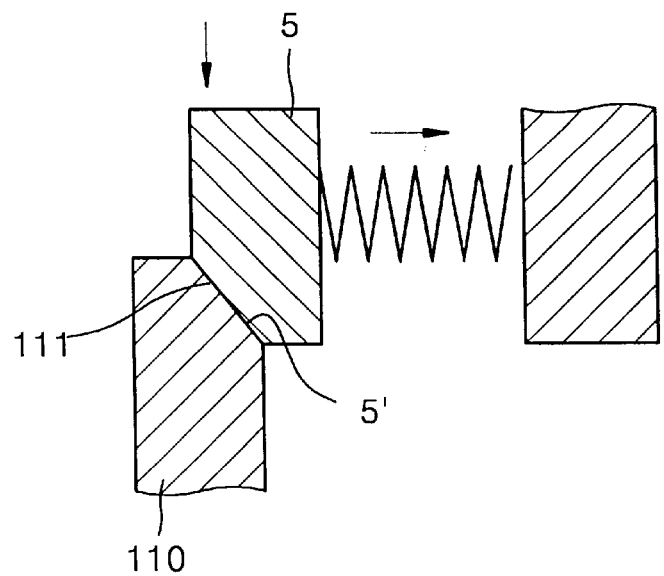
FIG. 5 shows a lock releasing operation performed by the hub lock releasing structure shown in FIG. 3.

Referring to FIG. 4, releasing pin 110 has an edge 111 which is brought into contact with the hub locking member 5 (FIG. 1) of tape cassette 7, and which is preferably chamfered. This is because the hub locking member 5 is continuously pressed against releasing pin 110, and thus a burr created at the edge(s) of the portion cut from the deck 100 and forming the releasing pin 110 can cause damage to the hub locking member 5. Also, the hub lock releasing operation, as shown in FIG. 5, is performed such that the hub locking member 5 slidably moves in a horizontal direction as the releasing pin 100 presses a sloping plane 5' formed on the hub locking member 5 of tape cassette 7. Thus, the hub lock releasing operation can be more smoothly performed by forming another sloping plane 111 on the releasing pin 110 by chamfering, and thereby causing sliding between the sloping planes 5' and 111.

Figure 6:
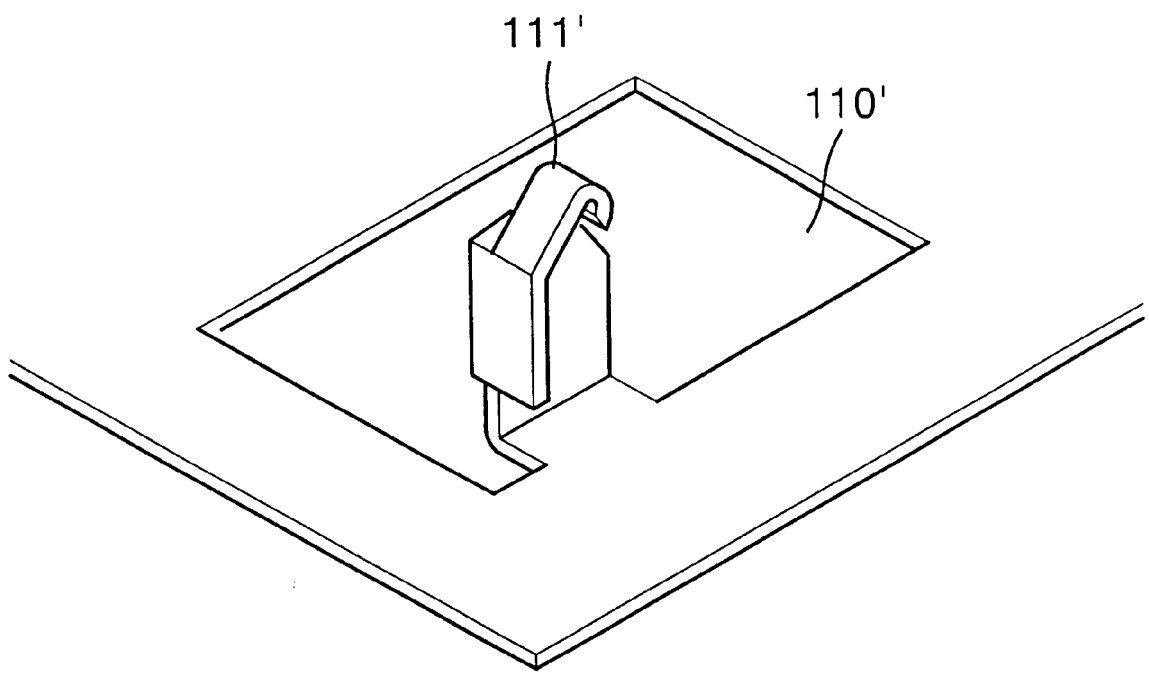
FIG. 6 shows a hub lock releasing structure according to another embodiment of the present invention.

However, referring to FIG. 6, if it is not possible to perform chamfering, one side of the releasing pin 110' can be bent and its free end 111' and folded inward so that any burr cannot directly contact the hub locking member 5 (FIG. 5). Thus, even if the releasing pin 110' (FIG. 6) is formed by a bending process, the damage to the hub locking member 5 (FIG. 5) due to a burr created during the bending process can be prevented.

As described above, in the hub lock releasing structure according to the present invention, a releasing pin 110 or 110' is integrally formed with a deck 100, thereby reducing the number of necessary components and simplifying the assembly process. In addition, the releasing pin 110 or 110' is formed in such a way as to prevent any burr created during the formation of the releasing pin 110 or 110' from damaging the hub locking member 5.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A hub lock releasing structure for a tape recorder, said structure comprising a releasing pin for releasing a hub from a locked state by pressing a hub locking member installed on a tape cassette in one direction as the tape cassette settles on a deck, wherein the releasing pin is integrally formed with the deck;

wherein the releasing pin is formed by cutting and bending a portion of the deck and folding a free end of the cut and bent portion inward so that a folded portion of the free end is brought into contact with the hub locking member.

2. The hub lock releasing structure according to claim 1, wherein the releasing pin is formed by chamfering an edge of the cut and bent portion, said edge being brought into contact with the hub locking member.

3. A hub lock releasing structure for a tape recorder having a deck for receiving a tape cassette, said tape cassette having a hub and a hub locking member, said structure comprising:

releasing pin means for releasing the hub from a locked state by pressing the hub locking member in one direction as the tape cassette settles on the deck;

wherein said releasing pin means comprises a releasing pin which is formed by cutting and bending a portion of the deck and folding a free end of the cut and bent portion inward so that a folded portion of the free end is brought into contact with the hub locking member.

4. The hub lock releasing structure according to claim 3, wherein said releasing pin is formed by chamfering an edge of the cut and bent portion, said edge being brought into contact with the hub locking member.

5. A method of fabricating a releasing pin for a hub lock releasing structure of a tape recorder, comprising the steps of:

(a) providing a deck in the tape recorder for receiving a tape cassette;

(b) partially cutting a portion of the deck;

(c) bending the cut portion of the deck upward to form the releasing pin; and (d) inwardly folding a free end of the bent cut portion forming the releasing pin so that a folded portion of the free end covers a cut edge of the bent cut portion.

6. The method according to claim 5, wherein step (d) further comprises chamfering an upwardly facing edge of the bent cut portion forming the releasing pin.

7. A method of fabricating a releasing pin for a hub lock releasing structure of a tape recorder, comprising the steps of:

(a) providing a deck in the tape recorder for receiving a tape cassette;

(b) partially cutting a portion of the deck;

(c) bending the cut portion of the deck upward to form the releasing pin;

(d) bending a side portion of the bent cut portion laterally so that the side portion forms an angle with a main portion of the bent cut portion; and (e) folding a top portion of the side portion over a top edge of the main portion.

8. The method according to claim 7, wherein step (e) comprises bending the top portion of the side portion at a junction line between the top portion and the side portion.

9. The method according to claim 8, wherein step (e) further comprises bending the top portion of the side portion along a line parallel to and displaced from the junction line so as to form an upwardly convex cover over the top edge of the main portion.

10. The method according to claim 7, wherein the angle formed in step (d) is at least 90 degrees.

11. A releasing pin mad by the method according to claim 1.

12. A releasing pin for a hub lock releasing structure of a tape recorder having a deck, said releasing pin comprising a portion of the deck which is partially cut and bent upward to form the releasing pin;

wherein the bent cut portion has a free end and a cut edge, and wherein the free end is inwardly folded so that folded portion of the free end covers the cut edge of the bent cut portion.

13. The releasing pin according to claim 12, wherein the bent cut portion has an upwardly facing edge which is chamfered.

14. A releasing pin for a hub lock releasing structure of a tape recorder having a deck, said releasing pin comprising a portion of the deck which is partially cut and bent upward to form the releasing pin;

wherein the bent cut portion has a main portion and a side portion, and wherein the side portion is laterally bent so that the side portion forms an angle with the main portion of the bent cut portion, and the side portion has a top portion which is folded over a top edge of the main portion.

15. The releasing pin according to claim 14, wherein the top portion of the side portion is bent at a junction line between the top portion and the side portion.

16. The releasing pin according to claim 15, wherein the top portion of the side portion is bent along a line parallel to and placed from the junction line so as to form an upwardly convex cover over the top edge of the main portion.

17. The releasing pin according to claim 14, wherein the angle formed by the side portion is at least 90 degrees.

* * * * *